Feb. 24, 1948.   W. P. LEAR   2,436,582
VARIABLE SPEED CONTROL SYSTEM
Filed Aug. 28, 1943   2 Sheets—Sheet 1
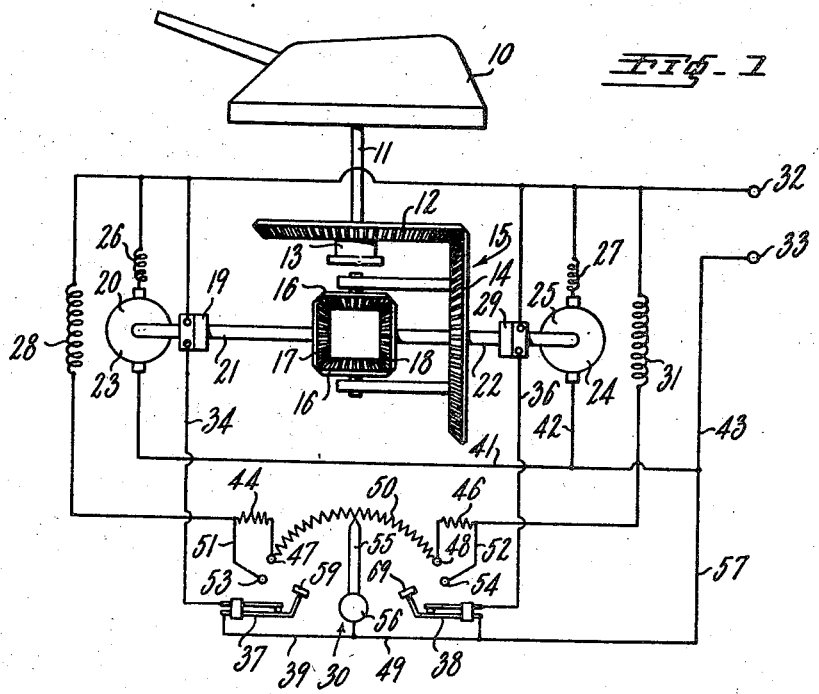
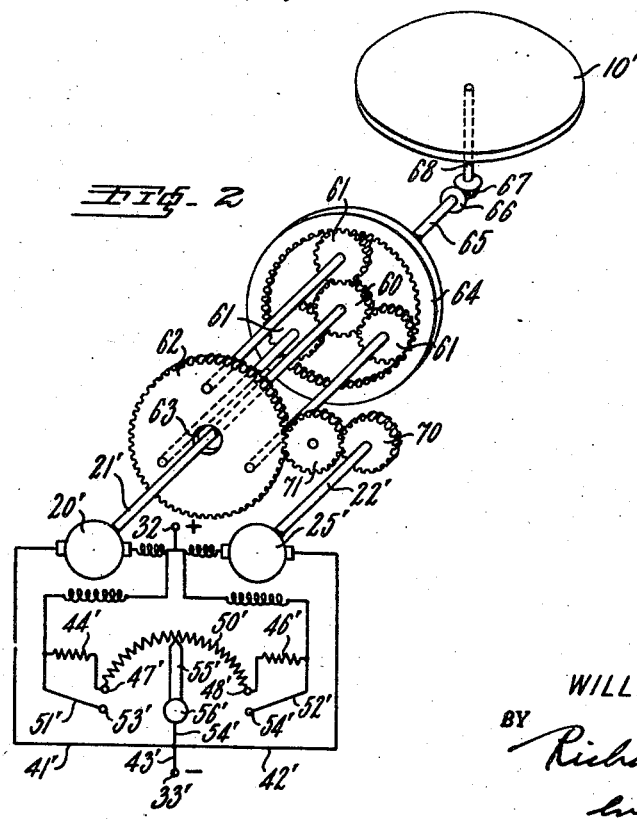
INVENTOR.
WILLIAM P. LEAR
BY Richard A. Marson
ATTORNEY

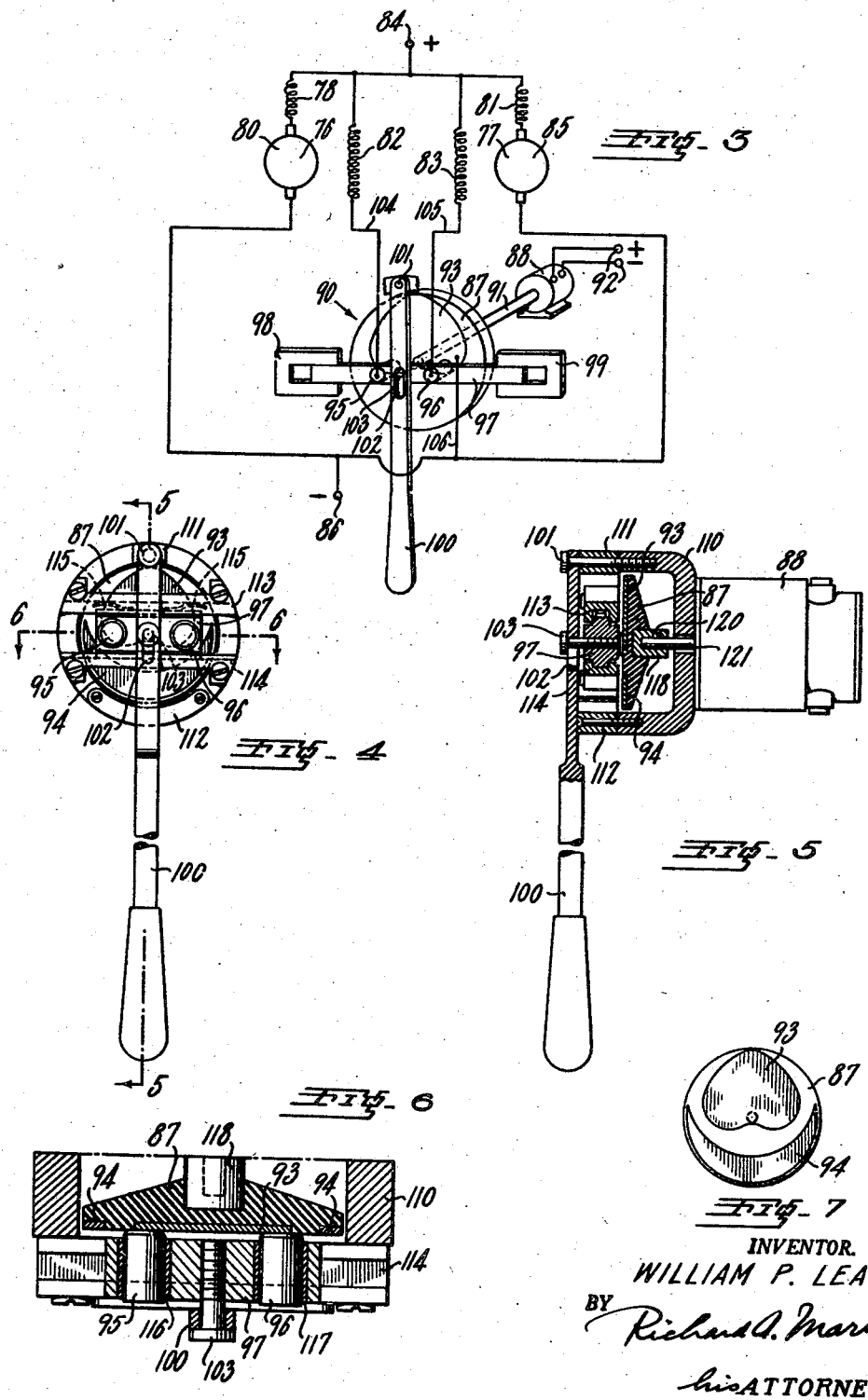

Patented Feb. 24, 1948

2,436,582

UNITED STATES PATENT OFFICE 2,436,582

VARIABLE-SPEED CONTROL SYSTEM

William P. Lear, North Hollywood, Calif., assignor, by mesne assignments, to Lear, Incorporated, Grand Rapids, Mich., a corporation of Illinois Application August 28, 1943, Serial No. 500,333

16 Claims. (Cl. 318—8)

This invention relates to variable speed control systems, and more particularly to a power and speed control system effective to smoothly accelerate a rotatable member and to effect accurate orientation thereof.

In various types of drives, it is necessary to combine relatively high power with relatively smooth acceleration. Particular instances of this are the driving and control systems for rotatable members which must be accurately and rapidly oriented. Among such devices are various aircraft accessories, such as turn-tables or turrets used for sighting cameras or bomb sights, or for training guns upon a target. In the latter case, particularly, a power and control system must be provided which is effective to rapidly slew the turret to a position of approximate orientation on the target; and which is then effective to smoothly and accurately align the guns directly on the target.

It is among the objects of this invention to provide a variable speed control system capable of rapidly effecting approximate orientation of a rotatable member and accurately effecting final orientation of the rotatable member; to provide a variable speed control system including a rotatable member, differential gearing having a pair of driving members continuously driven in opposite directions by power mechanisms, and means for varying the relative speeds of the power mechanisms for regulating the angular velocity of the rotatable member; to provide a variable speed control system including differential gearing having a pair of driving members each rotated in opposite directions by a pair of electric motors, with each motor having a shunt field winding, and including means for proportionating electric current from a source between the shunt field windings; to provide such a system including electromagnetic clutch and brake assemblies for selectively disconnecting each motor from the gearing and arresting motion of its associated driving member; to provide a control system for a gun turret effective to rapidly slew the turret into approximate orientation, and then to effect a vernier adjustment of the turret into accurate orientation; and to provide a novel controller for a pair of electric motors.

These and other objects, advantages and features of the invention will become apparent from the following description and accompanying drawings. In the drawings:

Fig. 1 is a schematic illustration of one embodiment of the control system of the invention.

Fig. 2 is a schematic illustration of a modification of the embodiment of the invention shown in Fig. 1.

Fig. 3 is a schematic illustration of another embodiment of the invention, incorporating a novel controller.

Fig. 4 is a plan view of a novel controller for two motors, forming part of the present invention.

Fig. 5 is a sectional view on the line 5—5 of Fig. 4.

Fig. 6 is a sectional view on the line 6—6 of Fig. 4.

Fig. 7 is an enlarged plan view of the commutator of the controller.

Referring to the drawings, in Fig. 1 there is schematically illustrated a rotatable driven member, such as a gun turret 10 which is adapted to be rotated through differential gearing 15 having a pair of driving members adapted to be continuously rotated in opposite directions by electric motors 20 and 25 through the medium of electromagnetic clutch and brake assemblies 19 and 29. Motors 20 and 25 are provided with shunt field windings so that the relative speeds of the motors may be varied by varying the strength of the shunt field windings through the medium of a controller arrangement 30, effective to divide the field energizing current between the shunt field windings. The controller arrangement 30 is such as to effect rapid rotation of member 10 into approximate orientation, and vernier adjustment of member 10 into accurate orientation.

More particularly, member 10 is mounted on a vertical rotatable shaft 11 on the lower end of which is secured a driven bevel gear 12. Shaft 11 may be supported in a bearing 13. Driven member 12 is in engagement with a bevel gear 14 on which are mounted a plurality of sun pinions 16, 16. Each pair of sun pinions 16, 16 is diametrically aligned. The sun pinions 16 are in continuous engagement with driving pinions 17 and 18. Driving pinions 17 and 18 are continuously rotated in opposite directions by motors 20 and 25, respectively through the medium of electromagnetic clutches 19 and 29 and shafts 21 and 22. Each motor includes an armature 23 or 24, a series field winding 26 or 27 and a shunt field winding 28 or 31.

Electromagnetic clutches 19 and 29 preferably are of the type described in my United States Patent No. 2,267,114 issued December 23, 1941, entitled "Electromagnetic clutch." As described in said patent, each clutch includes a driving disk and a driven disk. When the clutch is energized, the disks are urged into magnetic and frictional coaction. Upon deenergization of the clutch, a spring snaps the driven disk into substantially instantaneous engagement with a braking surface. This action effects substantially instantaneous stopping of the driven member and gearing connected thereto.

Normally, motors 20 and 25 rotate in opposite directions at the same speed. Accordingly, driving pinions 17 and 18 are likewise rotated in opposite directions at the same speed. As a result, there is no relative movement of gear 14, and hence of driven gear 12, shaft 11 and turret 10. When the control system is effective, motors 20 and 25 are continuously energized so that no motor starting inertia is present when it is desired to rotate member 10. Control of the rotation of member 10 is effected by decreasing the speed of one motor 20 and simultaneously increasing the speed of the other motor 25, or vice versa. This will effect relative movement of gears 14 and 12 in one direction or the other, depending upon which motor 20 or 25 is rotating faster than the other.

The control of the speeds of rotation of motors 20 and 25 is effected, in the arrangement shown in Fig. 1, by varying the amount of resistance included in the shunt field windings. Current for energizing the motors is derived from a suitable source of alternating or direct current connected to terminals 32 and 33. Terminal 32 is commonly connected to series field windings 26 and 27, electromagnetic clutches 19 and 29 and shunt field windings 28 and 31. The opposite terminals of armature windings 23 and 24 are connected by conductors 41, 42 and 43 to the other terminal 33 of the source of electric current. The opposite terminals of clutches 19 and 29 are connected by conductors 34 and 36, respectively, to spring switches 37 and 38. The opposite terminals of shunt field windings 28 and 31 are each connected to one end of a resistor 44 or 46. The opposite ends of resistors 44 and 46 are connected to terminals 47 and 48 of a variable resistor 49. Resistances 44 and 46 may be shunted by conductors 51 and 52 which are connected to terminals 53 and 54, respective, aligned with resistance 49. Resistance 49 forms part of the controller 30 which also includes a movable contact 55 adjustable by a knob 56. Contact 55 is connected through conductors 39 and 49 to switches 37 and 38, respectively, and through conductors 57 and 43 to terminal 33 of the source of electric current.

The values of resistances 44, 46 and 49 are so chosen that when contact arm 55 is in the mid-position shown in Fig. 1, the total amount of resistance included in the circuit of both shunt field windings 28 and 31, is the same. Thus, in the mid-position of arm 55, motors 20 and 25 both will rotate at substantially the same speed. The motors are so arranged that they rotate pinions 17 and 18 in opposite directions. As motors 20 and 25 are rotating at the same speed in opposite directions, there is no relative movement of the gun turret 10 in this position. If contact 55 is now moved clockwise, a greater amount of resistance will be included in the circuit of shunt field winding 28 and a lesser amount in the circuit of shunt field winding 31. Therefore, the current flowing through shunt field winding 28 will decrease, and that flowing through shunt field 31 will be increased, and the speed of motor 20 will thereupon be increased and that of motor 25 will be decreased. This will effect relative movement of gear 14 and driven gear 12.

As contact arm 55 is moved further in a clockwise direction, the angular velocity of member 10 will increase until such time as the contact arm engages terminal 48. Preferably, the increase in speed of the turret 10 during movement of contact arm 55 from its mid-position to either terminal 47 or 48 is very small. In a typical instance, the rotational speed of turret 10 will be varied, during this range, from 1/8 of a degree per second to 10 degrees per second. If contact arm 55 is now moved clockwise to engage end contact 54, all of the resistances 44, 46 and 49 will be included in the circuit of shunt field winding 28, and no resistance will be included in the circuit of shunt field winding 31. During such movement, arm 55 will engage an insulated button 69 on spring switch 38, opening the switch contacts. This effects deenergization of clutch 29. As described in my said Patent No. 2,267,114, the driven disk of the clutch will be snapped into engagement with the braking surface, effecting substantially instantaneous stopping of driving member 18. Motor 25 will be disconnected from gearing 15 and motor 20 will be driving the gearing at substantially its maximum speed and full torque. Turret 10 will thus be rotated at a relatively large angular velocity. As a typical example, with one motor disconnected from the gearing and all the resistances included in the shunt field winding of the other motor, the rotational speed of turret 10 may be substantially 45° per second.

With the described arrangement, when it is desired to orient turret 10, contact arm 55 is swung into engagement with either end terminal 53 or 54, deenergizing either clutch 19 or 29. This moves the turret at a relatively large angular velocity, such as 45° per second, until such time as it is approximately oriented. When approximate orientation is achieved, contact arm 55 is moved back toward the mid-point of resistance 49 reenergizing clutch 19 or 29 and effecting a relatively slow movement of turret 10 to achieve accurate orientation thereof. In effect, when contact arm 55 is in engagement with resistance 49, a vernier adjustment of the orientation of turret 10 is achieved. Due to the fact that both motors 20 and 25 are continuously rotating at all time, the acceleration of turret 10 is rapidly and smoothly attained, particularly as there is no starting inertia of the motors to be overcome.

The control circuit shown in Fig. 2 is the same as that shown in Fig. 1, but a planetary type of differential gearing arrangement is used to interconnect motors 20' and 25' with the rotatable member 10'. In this arrangement, shaft 21' of motor 20' terminates in a driving pinion 60. Driving pinion 60 is engaged by a plurality of planetary pinions 61 which are rotatably mounted on a spur gear 62. Spur gear 62 is provided with an aperture 63 through which shaft 21' extends. Planetary pinions 61 also mesh with an internal ring gear 64 having a shaft 65 on which is a bevel pinion 66. Pinion 66 meshes with a bevel pinion 67 on the lower end of a shaft 68 on which is mounted rotatable member 10'. Shaft 22' of motor 25' terminates in a driving pinion 70 which meshes with idler pinion 71 engaging spur gear 62. The arrangement is such that when motors 20' and 25' are rotated at the same speed and in the same direction, no rotation of internal ring gear 64 is effected. If spur gear 62 were stationary, pinion 60 would tend to rotate ring gear 64 through planetary pinions 61. However, spur gear 62 is rotated in a direction to counteract such rotation of ring gear 64 through the medium of driving pinion 70 and idler pinion 71.

The electric circuit control arrangement of Fig. 2 is the same as that of Fig. 1, except that electromagnetic clutches 19 and 29 and spring switches 37 and 38 have been omitted to simplify the illustration. It should be understood, however, that clutches 19, 29 and switches 37, 38 may be incorporated in the arrangement of Fig. 2 in the same manner as Fig. 1. As the operation of the control circuit is the same as previously described, further description at this point is believed unnecessary.

The modification of the invention illustrated in Fig. 3 of the drawing operates on the principle of providing periodic current impulses for the shunt field windings of the motors, and varying the duration of the respective impulses for each winding to in turn vary the average current therethrough. Thus, the variation in the average current of the shunt field windings effects a variation in the speed of the motors. To simplify the illustration, the connections of the motors 80 and 85 to the driven member through gearing which may be similar to that shown in either Fig. 1 or Fig. 2, and the electromagnetic clutches and associated spring switches, have not been illustrated. Each motor includes an armature 76, 77, a series field winding 78, 81, and a shunt field winding 82, 83. One terminal of each of the field windings is connected to a terminal 84 of a suitable source of alternating or direct current. The opposite terminals of the shunt field windings are connected to a controller 90. Controller 90 and the opposite terminals of armatures 76 and 77 are connected to terminal 86 of the source of alternating or direct current.

The controller 90 is effective to divide the total shunt field current between windings 82 and 83. It comprises a circular block of insulating material 87 adapted to be rapidly rotated by a motor 88 through a shaft 91. Motor 88 is connected to a suitable source of alternating or direct current through terminals 92. As shown more particularly in Fig. 7 a cardoidal shaped electrically conductive section 93 is inset in the surface of member 87. It will be noted that plate 93 is eccentrically mounted with respect to member 87. A crescent shaped piece of conductive material 94 is mounted on the opposite periphery of member 87 to achieve dynamic balance.

Conductive plate 93 is adapted to be engaged by a pair of brushes 95 and 96 mounted on a slide 97 moving in guide ways 98 and 99. A handle 100 pivoted at 101 to a fixed portion of the controller, is connected to slide 97 through the medium of slot 102 and a pin 103. Movement of handle 100 will move slide 97 to move brushes 95 and 96 as a unit diametrically of member 87 and plate 93. Field windings 82 and 83 are connected through conductors 104 and 105 to brushes 95 and 96 respectively. A conductor 106 connects plate 93 to terminal 86. Balancing piece 94 may be connected to ground.

In operation, motor 88 rapidly rotates member 87 and plate 93. Due to such rotation, brushes 95 and 96 will respectively be in engagement with plate 93 during each rotation for a period of time dependent upon relative distance of each brush from the center of member 87. In the position shown in Fig. 3, both brushes will engage the member 93 for the same amount of time. If handle 100 is swung to the left, brushes 95 and 96 will be moved diametrically toward the left. Under such conditions, brush 96 will be in substantially continuous engagement with plate 93, while brush 95 will only engage the plate during the time that the radially outer end of plate 93 passes beneath brush 95. Winding 83 will thus receive current impulses of greater duration than those received by winding 82. Accordingly, shunt field winding 83 will be strengthened and winding 82 will be weakened. This will cause an increase in the speed of motor 80 and a decrease in the speed of motor 85. As explained in connection with Fig. 1, this will correspondingly effect a rotation of the rotatable member connected through differential or planetary gearing to motors 80 and 85.

The design of cardoidal plate 93, is such that the average time of energization of one field will be gradually increased with respect to that of the other field over a relatively short range of angular velocities of the driven member, and will be rapidly increased at a point beyond the upper limit of such range of angular velocities. Thus, if the gun turret of Fig. 1 is connected to the motors 80 and 85, the turret may be rapidly moved to approximate orientation and then be accurately orientated with a vernier adjustment.

The particular construction of the controller 90 is illustrated in Figs. 4, 5 and 6. As shown, the controller includes a cup-shaped casing 110 to which are secured a mounting block 111, to which handle 100 is pivoted as at 101, and a supporting block 112 disposed opposite member 111. Guide ways 113 and 114 are provided extending diametrically of member 110 and slide 97 is mounted in these guide ways. One guide way 113 is provided with a deeper groove than the other guide way 114. Slide 97 is provided with springs 115 which engage guide way 113 and force slide 97 into engagement with guide way 114. Brushes 95 and 96, which may be of suitable material such as carbon, are mounted in bushings 116 and 117 respectively in slide 97. The rotatable insulating member 87 is secured on a bushing 118 fastened by a set screw 120 to a shaft 121 which is driven by motor 88. The latter is suitably fastened to the bottom of casing 110.

While the described controller has been illustrated in connection with the variable speed control system of the invention, it will be obvious to those skilled in the art that the controller is equally applicable for use with any arrangement in which the relative speed of a pair of electric motors are to be controlled. As explained the control principle is based upon varying the duration of each of a respective series of current impulses to the controlled members. This is accomplished by the use of a cardoidal plate of conducting material mounted in an insulating member in such a manner that by moving a pair of brushes diametrically to the member, the respective time during which each brush engages the conductive plate may be varied over a relatively wide range.

While specific embodiments of the invention have been shown and described in order to illustrate the principles of the invention, it will be understood by those skilled in the art that the invention may be otherwise embodied without departing from such principles.

What is claimed is:

1. A speed control system comprising, in combination, a rotatable member; a differential gearing having a driven member connected to said rotatable member and a pair of driving members; a pair of electric motors each connectible to one of said driving members and arranged to rotate said driving members in opposite directions, each motor including a shunt field winding; clutch means each effective to connect one motor to its associated driving member; control mechanism arranged to progressively, in small increments, decrease the shunt field current of one motor while increasing the shunt field current of the other motor to gradually accelerate said rotatable member through a predetermined relatively small range of velocities; and electric means operative by said mechanism, when the speed of said rotatable member has reached the upper limit of said predetermined range of velocities, abruptly greatly decrease the field current of said one motor and correspondingly greatly increase the field current of said other motor, and to disengage the clutch connecting said other motor to its associated driving member, to abruptly increase the speed of said rotatable member to a maximum value several times said upper limit.

2. A speed control system comprising, in combination, a rotatable member; a differential gearing having a driven member connected to said rotatable member and a pair of driving members; a pair of electric motors each connectible to one of said driving members and arranged to rotate said driving members in opposite directions, each motor including a shunt field winding; clutch means each effective to connect one motor to its associated driving member; control mechanism arranged to progressively, in small increments, decrease the shunt field current of one motor while increasing the shunt field current of the other motor to gradually accelerate said rotatable member through a predetermined relatively small range of velocities; and electric means operative by said mechanism, when the speed of said rotatable member has reached the upper limit of said predetermined range of velocities, abruptly greatly decrease the field current of said one motor and correspondingly greatly increase the field current of said other motor, and to disengage the clutch connecting said other motor to its associated driving member, to abruptly increase the speed of said rotatable member to a maximum value several times said upper limit; said control mechanism including a source of electric current and means connected to each of said shunt field windings and arranged to proportion the current from said source between said shunt field windings.

3. A speed control system comprising, in comprising, in combination, a rotatable member; a differential gearing having a driven member connected to said rotatable member and a pair of driving members; a pair of electric motors each connectible to one of said driving members and arranged to rotate said driving members in opposite directions, each motor including a shunt field winding; clutch means each effective to connect one motor to its associated driving member; control mechanism arranged to progressively, in small increments, decrease the shunt field current of one motor while increasing the shunt field current of the other motor to gradually accelerate said rotatable member through a predetermined relatively small range of velocities; and electric means operative by said mechanism, when the speed of said rotatable member has reached the upper limit of said predetermined range of velocities, abruptly greatly decrease the field current of said one motor and correspondingly greatly increase the field current of said other motor, and to disengage the clutch connecting said other motor to its associated driving member, to abruptly increase the speed of said rotatable member to a maximum value several times said upper limit; said control mechanism including a source of electric current and an adjustable resistance including a contact arm connected to said source of current; said electric means including a pair of fixed resistances each connected to one end of said adjustable resistance and to one of said shunt field windings and electric circuit means cooperating with said contact arm for shunting one of said fixed resistances with respect to its connected field winding, and connecting it in circuit with the other shunt field winding, in each extreme position of said contact arm.

4. A speed control system comprising, in combination, a rotatable member; a differential gearing having a driven member connected to said rotatable member and a pair of driving members; a pair of electric motors each connected to one of said driving members and arranged to rotate said driving members in opposite directions, each motor including a shunt field winding; and control means arranged to progressively decrease the shunt field current of one motor while progressively increasing the shunt field current of the other motor to gradually accelerate said rotatable member through a predetermined relatively small range of velocities and including means effective, when the speed of said rotatable member has reached the upper limit of said predetermined range of velocities, to abruptly increase the speed of said rotatable member to a maximum value several times said upper limit; said control means including a source of electric current, circuit controller means connected to said source of current and including rotatable means operative to periodically connect said source of current to each of said shunt field windings and mechanism adjustable to vary the duration of the period during which each shunt field winding is connected to said source of current.

5. A speed control system comprising, in combination, a rotatable member; a differential gearing having a driven member connected to said rotatable member and a pair of driving members; a pair of electric motors each connected to one of said driving members and arranged to rotate said driving members in opposite directions, each motor including a shunt field winding; and control means arranged to progressively decrease the shunt field current of one motor while progressively increasing the shunt field current of the other motor to gradually accelerate said rotatable member through a predetermined relatively small range of velocities and including means effective, when the speed of said rotatable member has reached the upper limit of said predetermined range of velocities, to abruptly increase the speed of said rotatable member to a maximum value several times said upper limit; said control means including a source of electric current, a circular member of insulating material, a cardoidal plate of electrically conductive material mounted thereon and connected to said source of current, means for rotating said circular member, a pair of brushes engageable with said cardoidal plate and each connected to one of said shunt field windings and means for adjusting said brushes as a unit diametrically of said circular member to vary the duration of the period during which each shunt field winding is connected to said source of current.

6. A speed control system comprising, in combination, a rotatable member; a differential gearing having a driven member connected to said rotatable member and a pair of driving members; a pair of electric motors each connected to one of said driving members and arranged to rotate said driving members in opposite directions, each motor including a shunt field winding; a pair of electromagnetic clutches each effective, upon energization, to connect one of said motors to its associated driving member and, upon deenergization to disconnect such motor and arrest motion of the associated driving member; and control means arranged to progressively decrease the shunt field current of one motor while progressively increasing the shunt field current of the other motor to gradually accelerate said rotatable member through a predetermined relatively small range of velocities and including means effective when the speed of said rotatable member has reached the upper limit of said predetermined range of velocities, to deenergize one of said clutches and abruptly arrest motion of the associated driving member to abruptly increase the speed of said rotatable member to a maximum value several times said upper limit.

7. A speed control system comprising, in combination, a rotatable member; a differential gearing having a driven member connected to said rotatable member and a pair of driving members; a pair of electric motors each connected to one of said driving members and arranged to rotate said driving members in opposite directions, each motor including a shunt field winding; a pair of electromagnetic clutches each effective, upon energization, to connect one of said motors to its associated driving member and, upon deenergization to disconnect such motor and arrest motion of the associated driving member; and control means arranged to progressively decrease the shunt field current of one motor while progressively increasing the shunt field current of the other motor to gradually accelerate said rotatable member through a predetermined relatively small range of velocities and including means effective when the speed of said rotatable member has reached the upper limit of said predetermined range of velocities, to deenergize one of said clutches and abruptly arrest motion of the associated driving member to abruptly increase the speed of said rotatable member to a maximum value several times said upper limit; said control means including a source of electric current; an adjustable resistance including a contact arm connected to said source of current; a pair of fixed resistances each connected to one end of said adjustable resistance and to one of said shunt field windings; electric circuit means cooperating with said contact arm for shunting one of said fixed resistances with respect to its connected field winding, and connecting it in circuit with the other shunt field winding, in each extreme position of said contact arm; and switch means actuated by said contact arm in each extreme position thereof to deenergize one of said clutches.

8. A speed control system comprising, in combination, a rotatable member; a pair of electric motors each having a shunt field winding; planetary differential gearing connecting said motors to said rotatable member and including a first driving gear connected to one of said motors, a second driving gear connected to the other of said motors, an internal ring gear connected to said rotatable member, a relatively large spur gear, a plurality of planetary pinions rotatably mounted on said spur gear and engaging said first driving gear and said ring gear and an idler gear engaging said spur gear and said second driving gear; and control means arranged to progressively decrease the shunt field current of one motor while progressively increasing the shunt field current of the other motor to gradually accelerate said rotatable member through a predetermined relatively small range of velocities and including means effective, when the speed of said rotatable member has reached the upper limit of said predetermined range of velocities, to abruptly increase the speed of said rotatable member to a maximum value several times said upper limit; said control means including a source of electric current, circuit controller means connected to said source of current and including rotatable means operative to periodically connect said source of current to each of said shunt field windings.

9. A speed control system comprising, in combination, a rotatable member; a pair of electric motors each having a shunt field winding; planetary differential gearing connecting said motors to said rotatable member and including a first driving gear connected to one of said motors, a second driving gear connected to the other of said motors, an internal ring gear connected to said rotatable member, a relatively large spur gear, a plurality of planetary pinions rotatably mounted on said spur gear and engaging said first driving gear and said ring gear and an idler gear engaging said spur gear and said second driving gear; and control means arranged to progressively decrease the shunt field current of one motor while progressively increasing the shunt field current of the other motor to gradually accelerate said rotatable member through a predetermined relatively small range of velocities and including means effective, when the speed of said rotatable member has reached the upper limit of said predetermined range of velocities, to abruptly increase the speed of said rotatable member to a maximum value several times said upper limit; said control means including a source of electric current, a circular member of insulating material, a cardoidal plate of electrically conductive material mounted thereon and connected to said source of current, means for rotating said circular member, a pair of brushes engageable with said cardoidal plate and each connected to one of said shunt field windings and means for adjusting said brushes as a unit diametrically of said circular member to vary the duration of the period during which each shunt field winding is connected to said source of current.

10. A circuit controller for proportioning current between circuits, said controller comprising, in combination, a circular member of insulating material; a cardoidal plate of electrically conductive material mounted thereon and adapted to be connected to a source of current; means for rotating said circular member; a pair of brushes engageable with said cardoidal plate and each adapted to be connected to one of the circuits; and means for adjusting said brushes as a unit diametrically of said circular member to vary the duration of the period during which each circuit is connected to the source of current.

11. A circuit controller for proportioning current between circuits, said controller comprising, in combination. a circular casing; a circular member of insulating material rotatably mounted in said casing; a cardoidal plate of electrically conductive material mounted thereon and adapted to be connected to a source of current; means for rotating said circular member; a slide adjustable diametrically of said casing; a pair of brushes mounted on said slide and engageable with said cardoidal plate and each adapted to be connected to one of the circuits; and means for adjusting said slide diametrically of said circular member to vary the duration of the period during which each circuit is connected to the source of current.

12. A circuit controller for proportioning current between circuits. said controller comprising, in combination, a circular casing; a circular member of insulating material rotatably mounted in said casing; a cardoidal plate of electrically conductive material mounted thereon and adapted to be connected to a source of current; means for rotating said circular member; a slide adjustable diametrically of said casing; a pair of brushes mounted on said slide and engageable with said cardoidal plate and each adapted to be connected to one of the circuits; and a handle pivotally connected to said casing and slidably and pivotally connected to said slide for adjusting said slide diametrically of said circular member to vary the duration of the period during which each circuit is connected to the source of current.

13. A circuit controller for proportioning current between circuits, said controller comprising, in combination, a circular casing; a cardoidal plate of electrically conductive material eccentrically mounted thereon and adapted to be connected to a source of current; means for rotating said circular member; a pair of brushes engageable with said cardoidal plate and each adapted to be connected to one of the circuits; means for adjusting said brushes as a unit diametrically of said circular member to vary the duration of the period during which each circuit is connected to the source of current; and a crescent of conductive material eccentrically mounted on said circular member in a position dynamically balancing said cardoidal plate.

14. A circuit controller for proportioning current between circuits, said controller comprising, in combination, a circular casing; a circular member of insulating material rotatably mounted in said casing; a cardoidal plate of electrically conductive material eccentrically mounted thereon adapted to be connected to a source of current; means for rotating said circular member; a slide adjustable diametrically of said casing; a pair of brushes mounted on said slide engageable with said cardoidal plate and each adapted to be connected to one of the circuits; a handle pivotally connected to said casing and slidably and pivotally connected to said slide for adjusting said slide diametrically of said circular member to vary the duration of the period during which each circuit is connected to the source of current; and a crescent of conductive material eccentrically mounted on said circular member in a position dynamically balancing said cardoidal plate.

15. A rotatable gun turret control mechanism effective to rapidly orient a gun turret to an approximate position and from such approximate position to its final position in minute steps, comprising, in combination, a rotatable member secured to the gun turret; a differential gearing having a driven member connected to said rotatable member and a pair of driving members; a pair of electric motors each connectible to one of said driving members and arranged to rotate said driving members in opposite directions, each motor including a shunt field winding; clutch means each effective to connect one motor to its associated driving member; control mechanism arranged to progressively, in small increments, decrease the shunt field current of one motor while increasing the shunt field current of the other motor to gradually accelerate said turret through a predetermined relatively small range of velocities; and electric means operative by said mechanism, when the speed of said turret has reached the upper limit of said predetermined range of velocities, to abruptly greatly decrease the field current of said one motor and correspondingly greatly increase the field current of said other motor, and to disengage the clutch connecting said other motor to its associated driving member, to abruptly increase the speed of said turret to a maximum value several times the upper limit; said control mechanism including a source of electric current and an adjustable resistance including a contact arm connected to said source of current; said electric means including a pair of fixed resistances each connected to one end of said adjustable resistance and to one of said shunt field windings and electric circuit means cooperating with said contact arm for shunting one of said fixed resistances with respect to its connected field winding, and connecting it in circuit with the other shunt field winding in each extreme position of said contact arm.

16. A rotatable gun turret control mechanism effective to rapidly orient a gun turret to an approximate position and from such approximate position to its final position in minute steps, comprising, in combination, a rotatable member secured to the gun turret; a differential gearing having a driven member connected to said rotatable member and a pair of driving members; a pair of electric motors each connectible to one of said driving members and arranged to rotate said driving members in opposite directions, each motor including a shunt field winding; clutch means each effective to connect one motor to its associated driving member; control mechanism arranged to progressively, in small increments, decrease the shunt field current of one motor while increasing the shunt field current of the other motor to gradually accelerate said turret through a predetermined relatively small range of velocities from $\frac{1}{8}°$ per second to substantially $10°$ per second; and electric means operative by said mechanism when the speed of said turret has reached a value substantially $10°$ per second, to abruptly greatly decrease the field current of said one motor and correspondingly greatly increase the field current of said other motor, and to disengage the clutch connecting said other motor to its associated driving member, to abruptly increase the speed of said turret to slew the same at a speed of substantially 45° per second; said control mechanism including a source of electric current and an adjustable resistance including a contact arm connected to said source of current; said electric means including a pair of fixed resistances each connected to one end of said adjustable resistance and to one of said shunt field windings and electric circuit means cooperating with said contact arm for shunting one of said fixed resistances with respect to its connected field winding, and connecting it in circuit with the other shunt field winding, in each extreme position of said contact arm.

WILLIAM P. LEAR.

REFERENCES CITED

The following references are of record in the file of this patent:

UNITED STATES PATENTS

| Number | Name | Date |
|---|---|---|
| 436,127 | Edison | Sept. 9, 1890 |
| 1,270,028 | Henderson | June 18, 1918 |
| 1,235,132 | Gaylord et al. | July 31, 1917 |
| 962,268 | Sundh | June 21, 1910 |
| 1,881,011 | Wittkuhns | Oct. 4, 1932 |
| 1,477,862 | Barr | Dec. 18, 1923 |